United States Patent [19]

Wess et al.

[11] Patent Number: 5,699,143
[45] Date of Patent: Dec. 16, 1997

[54] METHOD AND APPARATUS FOR WRITING ONTO A PHOTOSENSITIVE MATERIAL USING A MODULATED LIGHT BEAM

[75] Inventors: Raymond Eugene Wess, Holley; Mark Marshall Meyers, Hamlin, both of N.Y.

[73] Assignee: Eastman Kodak Company, Rochester, N.Y.

[21] Appl. No.: 387,546

[22] Filed: Feb. 13, 1995

Related U.S. Application Data

[62] Division of Ser. No. 292,446, Aug. 18, 1994.

[51] Int. Cl.$^6$ .................................................. G03B 27/32
[52] U.S. Cl. .............................. 355/32; 355/71; 347/232
[58] Field of Search .............................. 355/32, 55, 71, 355/48, 50; 382/317; 347/224, 232

[56] References Cited

U.S. PATENT DOCUMENTS

| | | |
|---|---|---|
| 1,717,405 | 6/1929 | Pownie . |
| 2,566,264 | 8/1951 | Tuttle et al. . |
| 4,422,752 | 12/1983 | Thurm et al. ........................... 355/41 |
| 4,424,589 | 1/1984 | Thomas et al. .......................... 382/317 |
| 4,770,978 | 9/1988 | Matsutaka et al. . |
| 4,831,436 | 5/1989 | Birgmeir et al. . |
| 4,848,863 | 7/1989 | Kramer . |
| 4,891,691 | 1/1990 | Baba . |
| 4,933,687 | 6/1990 | Winsor ................................... 347/242 |
| 4,971,413 | 11/1990 | Inoue . |
| 5,008,702 | 4/1991 | Tanaka et al. ........................... 355/52 |
| 5,010,414 | 4/1991 | Clapp . |
| 5,154,995 | 10/1992 | Kawai . |
| 5,162,929 | 11/1992 | Roddy et al. . |
| 5,323,183 | 6/1994 | Tateoka et al. . |
| 5,359,388 | 10/1994 | Hollman ................................. 355/53 |

FOREIGN PATENT DOCUMENTS

91/06175  5/1991  WIPO .

OTHER PUBLICATIONS

Spencer, D.A.; "Colour Photography in Practice" 1996, pp. 172, 182–183, 188.
IBM Technical Disclosure Bulletin, vol. 14(1); (Jun. 1971) "Variable Intensity Filter Arrangement".

Primary Examiner—R. L. Moses
Attorney, Agent, or Firm—Frank Pincelli

[57] ABSTRACT

A method and apparatus for printing on to a photosensitive material. The apparatus includes a light source for producing light composed of at least two colors, a collimator for collimating the light produced by the light source so as form a beam of light, a modulator for modulating the beam of light in accordance with one of the predetermined color components, a filter for filtering out the color component which has been modulated, and a beam directing device for directing the modulated colored filter beam of light onto a photosensitive material.

20 Claims, 2 Drawing Sheets

METHOD AND APPARATUS FOR WRITING ONTO A PHOTOSENSITIVE MATERIAL USING A MODULATED LIGHT BEAM

This is a divisional of U.S. application Ser. No. 08/292,446, filed Aug. 18, 1994.

FIELD OF THE INVENTION

The present invention is directed to a method and apparatus which uses digital image information for writing onto a photosensitive material. In particular, the present invention is directed to a method and apparatus, which utilizes a modulated light begun for digitally printing onto a photosensitive material.

BACKGROUND OF THE INVENTION

There has been suggested in the prior art several methods for providing continuous tone digital printing. Examples of such digital printers are illustrated by laser, thermal, Light Emitting Diode (LED), and CRT printers. A significant problem associated with these type of digital printers include print speed, hardware expenses, print size, and media expense. For example, laser printing is very fast, however, laser printers are very expensive and require special photosensitive material. LED and CRT printers are relatively slow and are also relatively expensive to manufacture and operate.

The present invention provides a printer which is relatively inexpensive to make and use which is reliable for writing of white light onto a photosensitive material, which allows high speed writing of color images and the use of existing photosensitive material.

SUMMARY OF THE INVENTION

In one aspect of the invention there is provided a photographic printer comprising:

a light source for producing light composed of at least two colors;

a collimator for collimating the light produced by the light source so as form a beam of light;

a modulator for modulating the beam of light in accordance with one of the predetermined colors;

a filter for filtering out a beam of light having a color which has been modulated; and a beam directing device for directing the modulated colored filter beam of light onto a photosensitive material.

In another aspect of the present invention there is provided a method of modulating a light beam for use in a photographic printer comprising the steps of:

sequentially modulating a light beam composed of at least two colors with respect to each of the colors in accordance with predetermined image data; and filtering the modulated colored beam of light and exposing a photosensitive material with the modulated colored beam of light so as to form an image.

DETAILED DESCRIPTION OF THE PRESENT INVENTION

Figure 1:
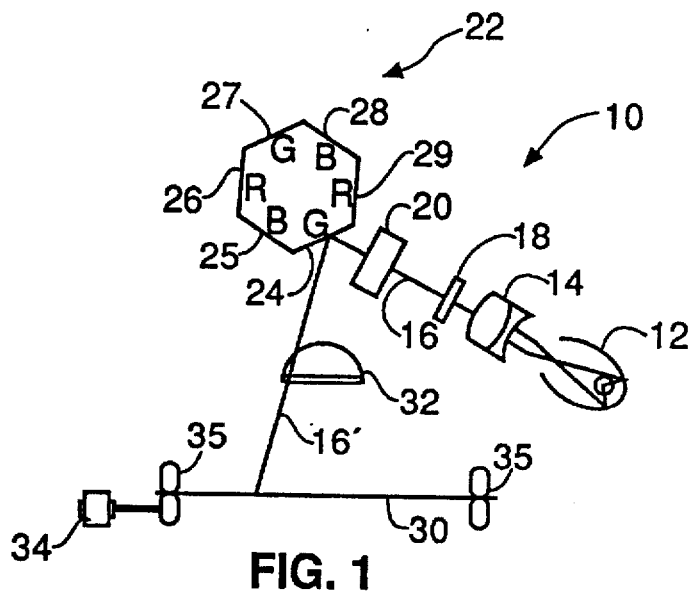
Referring to FIG. 1, there is illustrated a schematic diagram of a printing apparatus made in accordance with the present invention.
Figure 2:
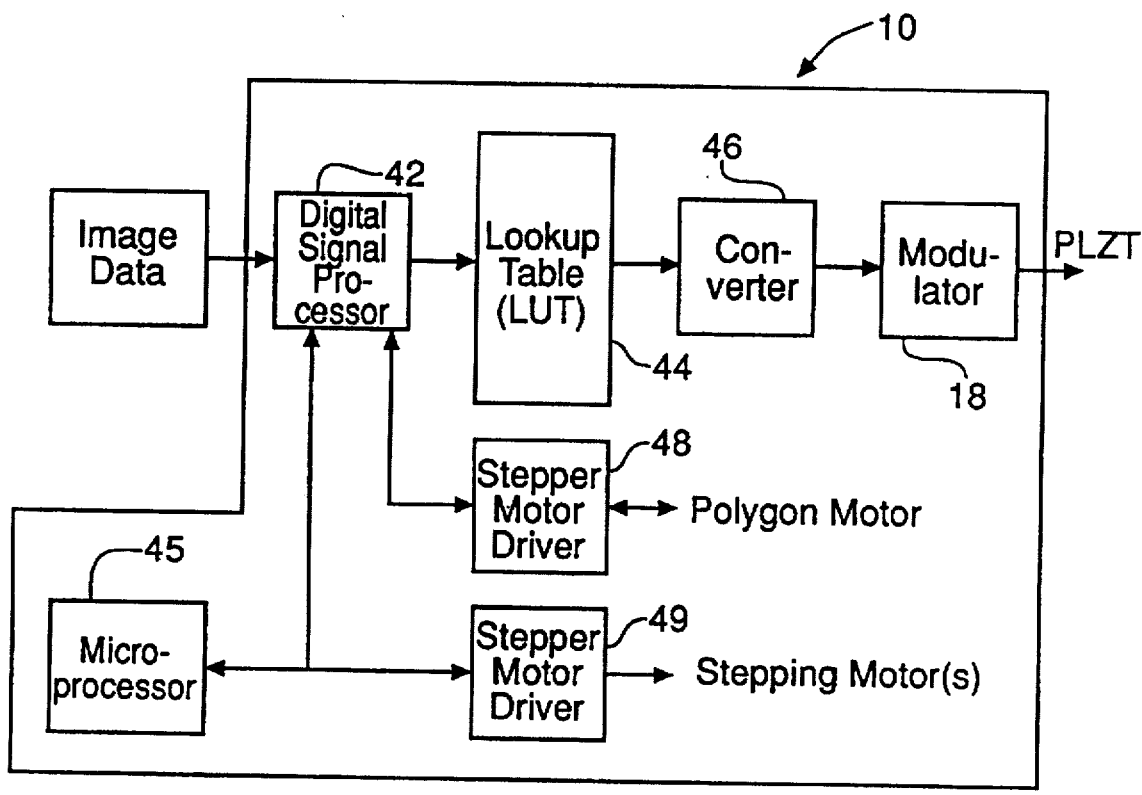
FIG. 2 is a block diagram of a digital printer made in accordance with FIG. 1.

Referring to FIGS. 1 and 2, there is illustrated a printer 10 made in accordance with the present invention. The printer 10 includes a white light source 12. In the particular embodiment illustrated, the white light source 12 comprises a xenon arc lamp, however, any suitable white light or other appropriate light source may be utilized. A suitable xenon arc lamp may be purchased from the Oriel Company or Optical Radiation Corporation. A collimating lens 14 is provided which collimates light emanating from the white light source 12 to form a beam of white light 16. The beam of white light 16 is then passed through a modulator 18 for modulating the intensity of the beam of white light 16 in accordance with image data with respect to a predetermined color. For example, digital image data obtained from a digital source such as the Photo CD scanner, sold by the Eastman Kodak Company. The modulator 18 may take a variety of different forms. For example, modulator 18 may comprise a PLZT or LCD, or any other appropriate light modulator. In the particular embodiment illustrated, the modulator 18 comprises a PLZT. A suitable PLZT that may be used is the Motorola SCS 1108A solid state ceramic shutter. A cylindrical lens 20 converts the beam 16 into a spot image, which can be used for writing on photosensitive material. The beam 16 is then passed on to a rotating polygon mirror 22 having a plurality of sides/facets 24, 25, 26, 27, 28, 29. The sides 24, 25, 26, 27, 28, 29 of the polygon mirror 22 are designed to reflect the light through an F-θ lens 32 which focuses the beam 16' onto a photosensitive media 30. In the particular embodiment illustrated, the photosensitive media 30 comprises photographic paper. However, the photosensitive material may comprise of any photosensitive media such as photographic film, electrostatic drum, etc. The sides of polygon mirror 22 are provided with absorption filters which are coated on sides/facets 24–29 such that light corresponding to the color that has been modulated will be reflected onto the photosensitive media 30. In the particular embodiment illustrated, sides 24 and 27 reflect green light, sides 25 and 28 reflect blue light, and sides 26 and 29 reflect red light. Thus, as the polygon mirror 22 rotates, various beams of colored light will be reflected onto the photosensitive media 30. The modulator 18 modulates the particular colored beam of light that is being reflected by the side upon which the beam 16 is being directed. For example, as illustrated, the modulator 18 is modulating the green color in the beam of light 16, such that the beam of light 16' being reflected from the polygon mirror 22 will be exposed onto the photosensitive media 30. As the polygon mirror 22 rotates, a different reflective beam of light 16' will be scanned across the photosensitive material 30. F-θ lens 32 focuses the spot as the beam 16 is deflected across the photosensitive media 30. As the polygon mirror 22 rotates, image information (red, green, or blue data, which corresponds to the filter laminate on the polygon mirror) is used by modulator 18 to modulate the light beam 16. A single red, green, or blue line of information is exposed onto the photographic media 30 as the polygon 22 rotates. A full line of color image is made by exposing the red, green, and blue information sequentially onto the photosensitive material 30. Once a single line has been fully exposed, the photosensitive media 30 is moved by two pair of pinch rollers which are rotated by stepper motor 34 so that the next line can be written onto the photosensitive material. This process of writing each line of image is repeated until a full color image has been exposed onto the photosensitive media 30.

Referring to FIG. 2, there is illustrated in diagrammatic form, how the digital printing apparatus 10 for exposing of photosensitive material. Image data, which is representative of digital information with respect to a particular image, for example, as obtained from a digital scanner which has scanned a developed film negative, is sent to the printer 10 with the appropriate image data being sent to digital signal processor 42. A three-channel 12-bit lookup table (LUT) 44, is used for determining the values that are appropriate for generating the intensity levels of density on the photosensitive material. The output of the LUT 44 is converted to an analog signal by converter 46, which is amplified as required by the modulator 18. A start of scan pulse synchronizes the rotation of the polygon mirror 22 in face with the data stream being supplied. Stepper motor drives 48, 49 provide signals for controlling motor 34 and a second motor (not shown) for rotating the polygon mirror 22 so that photosensitive media will be properly exposed. The process is completed when all the data information has been transferred and written onto photosensitive material. An microprocessor 45 is provided for controlling the operation of the printer 10 as is well known in the art.

Figure 3:
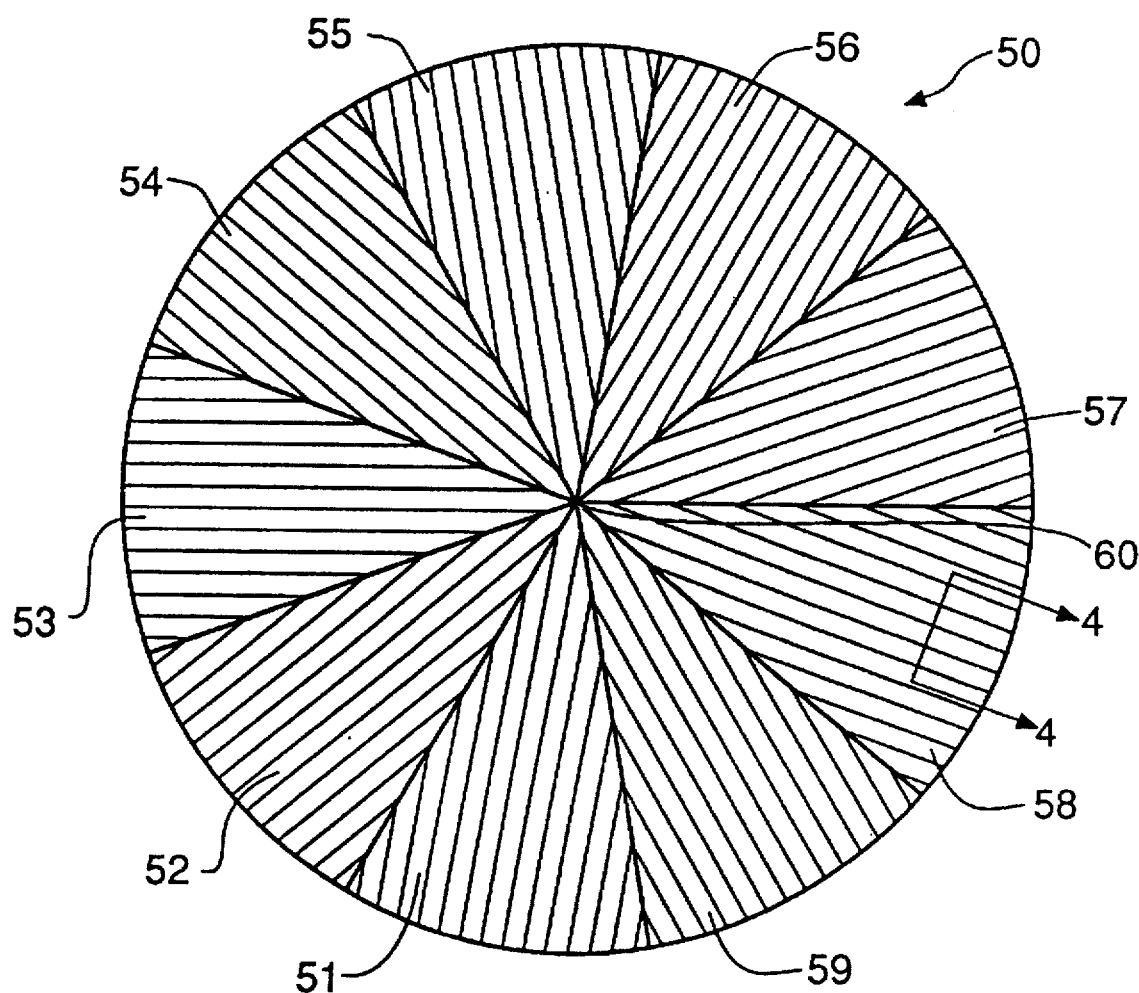
FIG. 3 is a top plan view of diffraction grating for use in the printing apparatus of FIG. 1.
Figure 4:
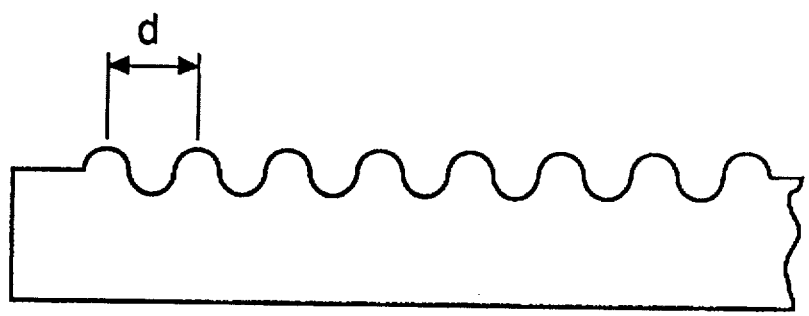
FIG. 4 is an enlarged cross-sectional view of the grating of FIG. 3 as taken along line 4—4.

It is to be understood that various changes and modifications may be made without departing from the scope of the present invention. For example, in the preferred embodiment illustrated, a rotating polygon mirror is used for selecting out the modulated color of light and for presenting it onto the photosensitive material. This could be accomplished by other methods, for example, a rotating diffraction grating having a plurality of different sections, each corresponding to a different color. For example, referring to FIGS. 3 and 4, there is illustrated a rotating diffraction grating 50 having sections 51, 52, 53, 54, 55, 56, 57, 58, 59. Grating 50 may be used in the apparatus of FIG. 2 taking the place of rotating polygon mirror. Sections 51, 54, and 57 selects out a first predetermined colored light, for example, green, whereas diffraction grating sections 52, 55 and 58 select out the blue colored light, and sections 53, 56 and 59 select out the red colored light. Referring to FIG. 4, there is illustrated a cross-sectional view of one of the section of grating 50. The grating comprises a surface relief or modulated refractive index with transmissive features spaced by the grating pitch d. By varying d to change the centrally diffracted wavelength, the desired color may be obtained, e.g., red, green or blue. As the diffraction grating is rotated about axis 58, each successive color will be selected out and diffracted through the lens onto the photosensitive material. The remaining part of the system will be identical to that previously described.

In the preferred embodiment, a white light source is provided which is modulated in accordance with the three primary colors (e.g., red, blue, and green). However, the light source may provide any other combination of colored light and any desired color component may be modulated.

Thus, there is provided a method and apparatus which is relatively low cost to manufacture and operate and can produce a relatively high volume of digital images.

It is to be understood that various other changes and modifications may be made without departing from the scope of the present invention, the present invention being defined by the following claims:

Parts List

10 . . . printer
12 . . . white light source
14 . . . collimating lens
16, 16' . . . beam of white light
18 . . . modulator
20 . . . cylindrical lens
22 . . . polygon mirror
24, 25, 26, 27, 28, 29 . . . sides/facets
30 . . . photosensitive media
32 . . . F-θ lens
34 . . . stepper motor
35 . . . pinch rollers
42 . . . digital signal processor
44 . . . lookup table (LUT)
45 . . . microprocessor
46 . . . converter
48, 49 . . . stepper motor drivers
50 . . . grating
51, 52, 53, 54, 55, 56, 57, 58, 59 . . . grating sections
58 . . . axis

We claim:

1. A photographic printer comprising:
   a white light source for producing white light;
   a collimator for collimating the white light produced by said light source so as to form to a beam of white light,
   a modulator for modulating the beam of white light in accordance with digital image data for a predetermined color;
   a filter for filtering out a beam of light of the predetermined color which has been modulated; and
   a beam directing device for directing the modulated colored filter beam of light onto a photosensitive material.

2. A photographic printer according to claim 1 wherein an achromatized cylindrical lens is provided for focusing of the modulated beam of white light prior to directing the beam of white light onto said filter.

3. A photographic printer according to claim 1 wherein a lens is provided for focusing of the colored filtered beam of light on to the photosensitive material.

4. A photographic printer according to claim 1 wherein said filter comprises a reflective mirror having a reflective filter coated on to surface of the mirror.

5. A photographic printer according to claim 1 wherein said filter comprises a diffraction grating having a spacing such that the central wavelength is in the center wavelength bands of the beam of light being modulated.

6. A photographic printer according to claim 1 wherein said modulator which modulates said beam of white light comprises a PLZT.

7. A photographic printer according to claim 1 wherein said modulator which modulates said beam of white light comprises a LCD.

8. A photographic printer according to claim 1 wherein said filter comprises a rotating polygon mirror having a plurality of mirror facets, said facets having alternating reflective filters coated on the facets each corresponding to one of the modulated beams of light such that the only the colored beam of light will be reflected.

9. A photographic printer according to claim 1 wherein said modulator modulates said beam of light in accordance with three primary colors.

10. A photographic printer according to claim 9 wherein said three colors comprise the colors red, blue and green.

11. A printer for exposing a photosensitive material comprising:
   a light source for producing light composed of at least two colors;

a collimator for collimating the light produced by said light source so as form a beam of light;

a modulator for modulating the beam of light in accordance with digital image data for one of said at least two colors;

a filter for filtering out a beam of light having a color which has been modulated; and a beam directing device for directing the modulated colored filter beam of light onto a photosensitive material.

12. A printer according to claim 11 wherein an achromatized cylindrical lens is provided for focusing of the modulated beam of light prior to directing the beam of light onto said filter.

13. A printer according to claim 11 wherein a lens is provided for focusing of the colored filtered beam of light on to the photosensitive material.

14. A printer according to claim 11 wherein said filter comprises a reflective mirror having a reflective filter coated on to surface of the mirror.

15. A printer according to claim 11 wherein said filter comprises a diffraction grating having a spacing such that the central wavelength is in the center wavelength bands of the beam of light being modulated.

16. A printer according to claim 11 wherein said modulator which modulates said beam of white light comprises a PLZT.

17. A photographic printer according to claim 11 wherein said modulator which modulates said beam of white light comprises a LCD.

18. A photographic printer according to claim 11 wherein said filter comprises a rotating polygon mirror having a plurality of mirror facets, said facets having alternating reflective filters coated on the facets each corresponding to one of the modulated beams of light such that the only the colored beam of light will be reflected.

19. A photographic printer according to claim 11 wherein said modulator modulates said beam of light in accordance with three primary colors.

20. A photographic printer according to claim 19 wherein said three colors comprise the colors red, blue and green.

* * * * *